Figure 1:
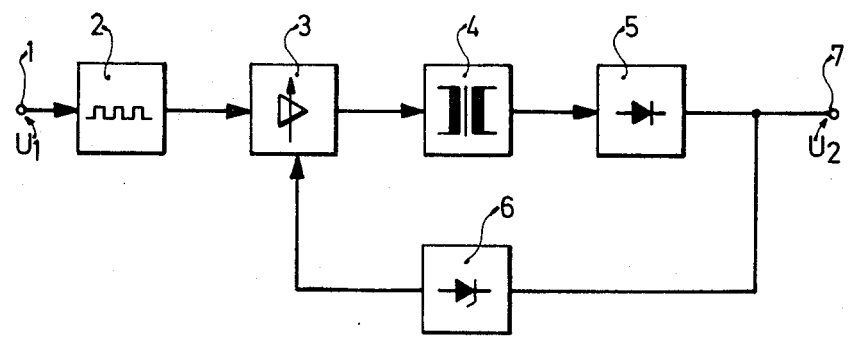

United States Patent [19]

Pagel et al.

[11] 4,251,847
[45] Feb. 17, 1981

[54] DC CONVERTER

[75] Inventors: Ernst-Olav Pagel, Böhmfeld; Hermann Vetter, Stuttgart, both of Fed. Rep. of Germany

[73] Assignee: Robert Bosch GmbH, Stuttgart, Fed. Rep. of Germany

[21] Appl. No.: 63,683

[22] Filed: Aug. 6, 1979

Related U.S. Application Data

[63] Continuation of Ser. No. 839,791, Oct. 6, 1977, abandoned.

[30] Foreign Application Priority Data

Oct. 26, 1976 [DE] Fed. Rep. of Germany ....... 2648309

[51] Int. Cl.³ .............................................. H02H 3/20
[52] U.S. Cl. ...................................... 361/91; 363/15; 363/50
[58] Field of Search ..................... 361/91, 88, 90, 56; 363/50, 52, 55, 56, 53, 15, 21; 323/9, 22 T, DIG. 1; 331/62, 183, 182

[56] References Cited

U.S. PATENT DOCUMENTS

| | | |
|---|---|---|
| 3,305,756 | 2/1967 | Doss et al. ........................ 363/50 X |
| 3,670,234 | 6/1972 | Joyce ................................ 361/91 X |
| 3,701,937 | 10/1972 | Combs .............................. 363/50 X |
| 3,913,036 | 10/1975 | Hook ................................ 331/183 X |
| 3,973,220 | 8/1976 | Fender et al. .................... 331/183 X |
| 4,005,351 | 1/1977 | Blum ................................ 363/50 |
| 4,084,219 | 4/1978 | Furukawa et al. ............... 363/21 |

Primary Examiner—Patrick R. Salce
Attorney, Agent, or Firm—Frishauf, Holtz, Goodman & Woodward

[57] ABSTRACT

The input dc voltage is used to operate an astable multivibrator, the output of which is supplied to an emitter-follower that is coupled to an amplifier through a current-limiting resistor, so that a transistor across the input of the amplifier can controllably reduce the amplification of the amplifier. The amplifier output is supplied to the primary winding of a transformer which has a secondary winding that feeds a rectifier to supply the output dc voltage. The output dc voltage is coupled back to the control transistor through a Zener diode and a resistor in series, so that when the output voltage exceeds the Zener diode voltage, the control transistor will reduce the amplification of the amplifier, reducing the amplitude of the rectified ac voltage and hence regulating the output voltage.

3 Claims, 2 Drawing Figures

DC CONVERTER

This is a continuation of application Ser. No. 839,791 filed Oct. 6, 1977; and now abandoned.

This invention concerns apparatus for converting electric power from a first dc voltage into a second dc voltage, particularly for converting the storage battery voltage in a vehicle to a voltage suitable for equipment requiring a different voltage or a more stabilized voltage.

BACKGROUND AND PRIOR ART

Among the various kinds of dc voltage converters that have become known is a common circuit in which the input dc voltage is chopped or is caused to produce periodic relaxation oscillations. The signals thus are transformed to a desired voltage range by means of a transformer with a suitable transformation ratio and then rectified.

Regulation circuits are also known in which the output voltage of dc voltage converters are regulated to a constant value, in order to counteract changes of the output voltage in the case of variations of the input voltage or of the output loading. Such regulation is carried out according to the known voltage regulator principles, so that, for example, the dc converter input voltage is compared with a reference voltage and the voltage difference is utilized to exert a control for regulating the dc converter input (primary side regulation). The dc converter output voltage can be correspondingly regulated. The disadvantage of this procedure is that large amounts of energy are used up in the regulating process itself. This is all the more disadvantageous because dc converters frequently serve for generating higher or more stabilized dc voltages from the voltage of a battery, for example the battery of a motor vehicle electrical system, for instance, where the energy consumption is an important consideration in the performance of any electrical function.

In the publication BBC-Nachrichten, 1974, Issue 10, p. 425, a circuit was disclosed that reduced the above-described disadvantages by using a keyed type of regulation. In this case the difference between the actual voltage and the desired voltage at the output of a dc converter was used for control of the keying ratio of the chopper. By interposition of a suitable LC circuit, the power output was indicated. Compared to a circuit with continuous regulation, this one has the advantage that the switching losses of a switching transistor are substantially smaller than the losses of a transistor acting as a variable valve, as used in a continuous control. There is the disadvantage, however, of the relatively high expense for the switching circuits.

In U.S. Pat. No. 3,263,124, a circuit is disclosed in which a Wien bridge oscillator is used instead of a chopper. The output is fed back to the base of a transistor on which there is applied in normal operation a desired or comparison voltage, through a Zener diode. If the output dc voltage increases to a certain value, the transistor is put in its conducting condition and short-circuits the coil of the Wien bridge oscillator. The disadvantage of this arrangement is that the frequency of the oscillator varies strongly over the regulation range. This is reflected on the one hand in transformer losses, and on the other hand the frequency can get into the audibility range of the human ear and become noticeable as a disturbing whistle.

The Present Invention

It is an object of the invention to provide a dc converter that operates at a fixed frequency and that provides good regulation at low circuit cost and with low energy consumption.

Briefly, an amplifier of variable amplification is interposed between the oscillator and the transformer, while the rectifier that follows the transformer provides a feedback through a voltage threshold circuits so that when the output voltage exceeds a predetermined value, a control voltage is applied to reduce the amplification of the interposed amplifier. This circuit has the advantage of operating at a fixed frequency in a circuit of low cost. Because of the fixed frequency, the transformer can be dimensioned so as to have low losses and there is no risk of the occurrence of disturbing whistling noises. Because of the small number of components in the circuit, the apparatus is insensitive to disturbances and it is therefore well-suited for application to motor vehicle equipment, where it can usefully provide stable dc voltage while being fed the strongly variable voltage of the usual vehicle dc supply system. This is especially useful for providing the power supply requirements of voltage-sensitive devices in a vehicle, for example digital minicomputers for control of vehicle functions.

Furthermore, on the core of a transformer of the dc converter, additional secondary windings can be provided from which voltages can be obtained that are independent to a large extent of input voltage and unregulated with reference to variations according to the number of turns in the winding and the direction of the winding. Output voltages can be obtained in this fashion that are larger or smaller than the input voltage of the dc converter and that have the same or the opposite polarity.

In a preferred embodiment, the voltage threshold circuit consists of a series combination of a resistance and a Zener diode, which series combination is connected to the base of a transistor. In this fashion the dc converter can be designed on the basis of maximum load conditions. If devices forming part of the load drop out or are shut off and the output voltage of the dc converter correspondingly increases, then when a particular voltage value set by a Zener diode is exceeded, the transistor operates to reduce the amplification of the amplifier. In this way, it is assured that voltage-sensitive circuits being supplied cannot be damaged or destroyed by over-voltage.

DRAWINGS

Figure 2:
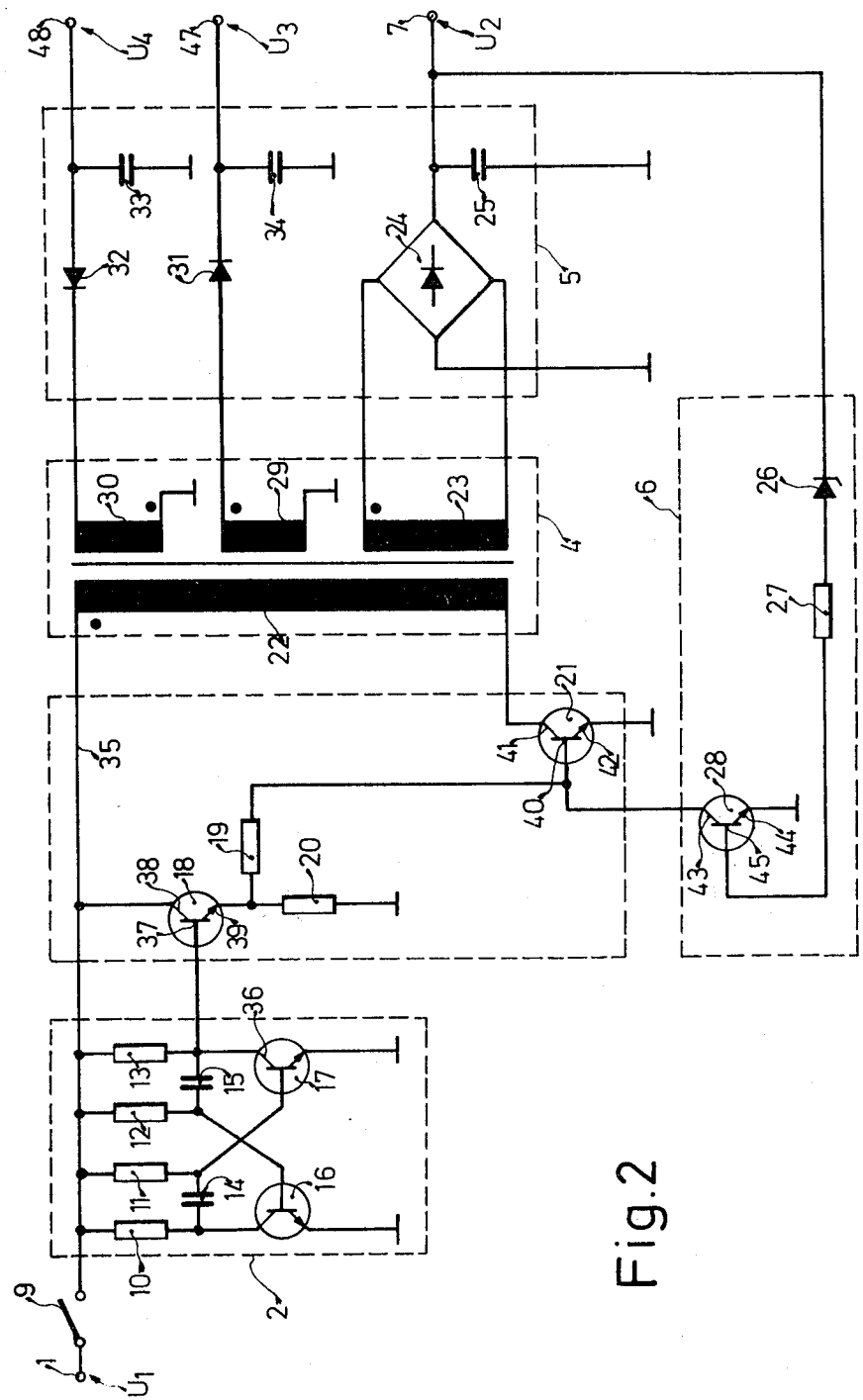

The invention is further described by way of example with reference to the drawings, in which:

FIG. 1 is a basic block diagram of a dc converter according to the invention, and FIG. 2 is a circuit diagram of an illustrative embodiment of such a dc converter.

In the basic diagram given in FIG. 1, the dc voltage $U_1$ present at the input terminal 1 serves as supply voltage for an oscillator 2, which is preferably an astable multivibrator. The output of the oscillator 2 is connected with the input of an amplifier 3 that is controllable with respect to its amplification factor. The output of the amplifier 3 is connected to the primary winding of the transformer 4, the secondary winding of which is connected to a rectifier circuit 5 having an output terminal 7 for providing the stabilized output dc voltage $U_2$.

In addition, a feedback path is provided from the output of the rectifier 5 to the amplification control of the amplifier 3 through a voltage threshold circuit 6.

Operation: The input dc voltage $U_1$ feeds the oscillator 2 at the output of which an ac signal is obtainable, the frequency of which is, as the result of known circuit provisions, independent of the magnitude of the input voltage. The ac signal is amplified in the variable amplification stage 3 and provided to the primary winding of the transformer 4. The secondary voltage is rectified in the rectifier 5, so that a dc voltage is again provided at the output terminal 7. If the voltage at the output terminal 7 exceeds a predetermined value, a signal then proceeds over the threshold voltage 6 to the amplification control input of the amplifier circuit 3, and the control voltage is so applied that in such a case the amplification of the stage 3 is reduced and the output voltage therefor likewise reduced.

FIG. 2 shows a detailed circuit diagram of an illustrative embodiment of the basic system of FIG. 1. The input dc voltage $U_1$ at the input terminal 1 proceeds over an on-off switch 9 for putting the circuit in or out of operation, to the voltage supply bus 35 of an oscillator 2 that has the form of an astable multivibrator, constituted in the usual way of resistors 10,11,12 and 13, capacitors 14 and 15 and transistors 16 and 17. The variable amplification stage 3 consists essentially of the transistors 18 and 21. A connection leads from the collector 36 of the transistor 17 to the base 37 of the transistor 18, which is connected in as an emitter follower, with its collector 38 connected to the positive supply line 35 and its emitter 39 connected through a resistor 20 to chassis ground, i.e. to the reference voltage providing the other side of the voltage supply. The emitter 39 is also connected through a resistor 19 with the base 40 of the transistor 21. The transistor 21 has its collector 41 connected through the primary winding 22 of the transformer 4 to the supply voltage and has its emitter 42 connected to chassis ground. The base 40 of the transistor 21 is also connected to the collector 43 of a control transistor 28, that has its emitter 44 connected to chassis ground. A secondary winding 23 of the transformer 4 is connected with a full-wave bridge rectifier 24 the outputs of which are connected respectively to the output terminal 7 and to chassis ground. The output terminal 7 is also connected to a smoothing capacitor 25 the other side of which is grounded.

The feedback path of the circuit consists of the series combination of a Zener diode 26 and a resistor 27, which combination is connected between the output terminal 7 and the base electrode 45 of the control transistor 28.

As a further feature of the invention, the transformer 4 is also provided with additional secondary windings 29 and 30 that both have one side connected to chassis ground and their other ends respectively connected to rectifier diodes 31 and 32 that provide rectified voltage respectively to output terminals 47 and 48 that are filtered respectively by capacitors 33 and 34, which both have one side connected to ground.

Operation: When the input voltage $U_1$ is connected through the enabling switch 9 to the voltage supply line 35, an astable relaxation oscillation takes place in the multivibrator consisting of the resistors 10–13, the capacitors 14 and 15 and the transistors 16 and 17. These relaxation oscillations produce a rectangular voltage wave of positive amplitude (i.e. of positive-going pulses) at the collector 36 of the transistor 17. The resistor 20 of the emitter-follower 18 to which this rectangular wave is supplied is of such magnitude that the transistor 18 will be fully turned on by the positive rectangular pulses at its base 37. The voltage drop across the resistor 20 is coupled over the resistor 19 to the base 40 of the transistor 21, so that the resistor 19 limits the emitter current of the control transistor 28 and the base current of the transistor 21. In normal operation without the feedback regulation coming into play, the transistor 21 is switched on and off by the rectangular signals arriving at its base 40, so that in step with these signals a current flows from the input terminal 1 through the primary winding 22 of the transformer and the transistor 21 to chassis ground. This current induces in the usual way a secondary voltage in the secondary windings 23,29 and 30, this current being of the same polarity or of opposite polarity according to the direction of the winding which is indicated in FIG. 2 in the usual way by dots.

The voltage induced in the secondary winding 23 is rectified in the full-wave bridge rectifier 24 and smoothed by the filter capacitor 25, so that at the output terminal 7 a dc voltage $U_2$ of the same polarity as the input voltage $U_1$ (in the illustrated example positive) can be obtained. If the voltage $U_2$ exceeds a certain value, base current begins to flow in the control transistor 28, coming through the Zener diode 26 and the resistor 27. In consequence, the control transistor 28 becomes partly conductive and reduces the base current of the transistor 21, so that the switching effect of the transistor 21 is reduced and the current in the secondary winding 23 falls off. If the output voltage at the terminal 7 is sufficient to apply fully the regulation just described, the control transistor 28 is fully turned on and short-circuits the base-emitter path of the transistor 21. When that happens, the transistor 21 can no longer switch over and no current flows through the primary winding 22 of the transformer, so that the voltage of the secondary winding 23 drops to zero. Thus by the choice of the components 26,27 and 28, a threshold value is provided for the output voltage and the regulating feedback path is capable of continuously regulating out voltage rises or voltage peaks above that threshold that may occur.

In addition to the secondary winding 23, additional secondary windings 29 and 30 can be provided in the transformer, in order to make available voltages considerably independent of the input voltage and unregulated with reference to variations in load. The secondary winding 29 is wound in the same direction as the winding 23, so that after rectification by the rectifier diode 31 and filtering by the capacitor 34, a voltage $U_3$ with the same polarity as the voltage $U_2$ can be obtained. Similarly, it is possible by provision of a secondary winding 30 wound in the opposite direction to produce an output voltage $U_4$ of opposite polarity with the transformer 4 operating as a pulse transformer. By a suitable choice of the transformation ratio provided by the number of turns of the respective primary and secondary windings, secondary voltages can be produced that are either larger or smaller than the primary voltages.

By way of specific illustrative example of a preferred embodiment, the following table of component values or types is given for the circuit of FIG. 2.

| Component | Type or Electrical Magnitude |
| --- | --- |
| Transistors 16 and 17 | BCY58X |

-continued

| Component | Type or Electrical Magnitude |
|---|---|
| Transistor 18 | BS × 45-16 |
| Transistor 21 | BD241 |
| Transistor 28 | BCY58X |
| Resistors 10 and 13 | 10kΩ |
| Resistors 11 and 12 | 100kΩ |
| Resistor 19 | 100Ω |
| Resistor 20 | 4.7kΩ |
| Resistor 27 | 100Ω |
| Capacitors 14 and 15 | 330pF |
| Capacitor 25 | 33μF |
| Capacitors 34 and 33 | 33μF |
| Zener diode 26 | ZPD10 |
| Diodes of bridge 24 | BA × 82 |
| Diodes 31 and 32 | BA × 82 |
| Transformer 4 | pot core 28φ × 23mm AL 1000 winding 22: 14 turns winding 23: 27 turns winding 29: 9 turns winding 30: 9 turns |

The frequency of the multivibrator 2, for an applied voltage $U_1$ of 19 V in the above example is 33 kHz.

Although the invention has been described with respect to a specific particular embodiment, it will be understood that variations are possible within the inventive concept.

We claim:

1. Apparatus for converting a first dc voltage ($U_1$) into a second dc voltage ($U_2$) comprising:

an oscillator (2) supplied with power by said first dc voltage for producing an electric wave output;

a transformer (4);

a rectifier circuit (5) connected to a secondary winding of said transformer (4);

an amplifier (3) of controllably and gradually variable amplification for providing an output corresponding to the output of said oscillator with variable amplification of the amplitude thereof, said amplifier being separate from said oscillator, having its input connected to the output of said oscillator (2) and having its output connected to a primary winding of said transformer (4), and means for reducing the amplification of said amplifier (3) when the output of said rectifier circuit (5) exceeds a predetermined voltage, said means being connected to said output of said rectifier circuit and to said amplifier and including a voltage threshold circuit (6) setting said predetermined voltage.

2. Apparatus as defined in claim 1, in which at least one additional secondary winding (29,30) is provided on said transformer (4).

3. Apparatus as defined in claim 1, in which said voltage threshold circuit (6) consists of a series connection of a Zener diode and of a resistance (27), said series connection being connected with the base electrode of a control transistor (28).

* * * * *